United States Patent [19]

Hanson

[11] Patent Number: 5,291,745

[45] Date of Patent: Mar. 8, 1994

[54] METHOD OF IMPROVING TEMPERATURE UNIFORMITY OF A SPACE CONDITIONED BY A REFRIGERATION UNIT

[75] Inventor: Jay L. Hanson, Bloomington, Minn.

[73] Assignee: Thermo King Corporation, Minneapolis, Minn.

[21] Appl. No.: 23,021

[22] Filed: Feb. 25, 1993

[51] Int. Cl.$^5$ .......................................... G05D 23/32
[52] U.S. Cl. ........................................ 62/89; 62/157; 62/186; 62/231; 62/228.4
[58] Field of Search .................... 62/89, 180, 157, 186, 62/231, 228.4, 239, 323.1, 229

[56] References Cited

U.S. PATENT DOCUMENTS

| | | | |
|---|---|---|---|
| 3,621,669 | 11/1971 | Nichols et al. | 62/157 |
| 3,635,044 | 1/1972 | Heth | 62/157 |
| 4,850,198 | 7/1989 | Helt et al. | 62/231 X |
| 4,977,751 | 12/1990 | Hanson | 62/81 |
| 5,123,252 | 6/1992 | Hanson | 62/89 |
| 5,123,253 | 6/1992 | Hanson et al. | 62/89 |
| 5,140,825 | 8/1992 | Hanson et al. | 62/89 |
| 5,140,826 | 8/1992 | Hanson et al. | 62/115 |
| 5,172,560 | 12/1992 | Jurewicz et al. | 62/160 X |

Primary Examiner—Harry B. Tanner
Attorney, Agent, or Firm—M. J. Moran

[57] ABSTRACT

A method of operating a refrigeration unit to improve the uniformity of temperature distribution in a conditioned space, with the refrigeration unit including a refrigerant compressor and an evaporator fan driven at a selectable one of high and low operating speeds by a prime mover arrangement. The method includes the step of periodically operating the compressor and evaporator fan at the higher of the two operating speeds, notwithstanding a set point temperature control algorithm calling for operation of the compressor at the lower of the two speeds. When the refrigeration unit is operating in a continuous mode, the value of a constant entered into an operating program by the user determines the minimum number of minutes of each hour the prime mover should be forced to operate in the higher speed mode. When the refrigeration unit is operating in a cycling start-stop mode, the value of the constant entered into the operating program by the user determines which operating cycles are to be performed with the prime mover in the high speed mode, notwithstanding a set point temperature control algorithm calling for the low speed mode.

17 Claims, 8 Drawing Sheets

METHOD OF IMPROVING TEMPERATURE UNIFORMITY OF A SPACE CONDITIONED BY A REFRIGERATION UNIT

TECHNICAL FIELD

The invention relates in general to refrigeration units, and more specifically to refrigeration units having a refrigerant compressor and an evaporator fan driven by a prime mover in at least two selectable speeds in response to a set point temperature control algorithm.

BACKGROUND ART

It is common for refrigeration units, especially transport refrigeration units, such as refrigeration units associated with trucks, trailers, containers, and the like, to include an internal combustion engine in a prime mover arrangement. The engine, which is usually a diesel engine, is arranged to drive a refrigerant compressor at a selected one of at least first and second operating speeds. The first operating speed, which is higher than the second operating speed, is selected by a set point temperature control algorithm during initial temperature pull down of an associated conditioned space. Thereafter, the second or lower operating speed is utilized to maintain the temperature of the conditioned space in a predetermined temperature range adjacent to the selected set point temperature. The first or higher operating speed is only resorted to during temperature extremes when the lower operating speed is not sufficient to maintain the selected set point temperature.

The air mover arrangements of the refrigeration unit, such as the condenser and evaporator fans or blowers are conventionally operated from the engine, such as by belt and pulley arrangements, and thus the air flow rates depend upon the selected operating speed of the engine, providing a higher air flow rate and velocity during the high speed operating mode than during the low speed operating mode.

This air mover drive arrangement is suitable for the condenser fan, since the condenser is normally rejecting less heat during low speed operation when the conditioned space is close to the set point temperature. The lower operating speed of the evaporator fan or blower, however, may adversely affect temperature uniformity in the conditioned space. This is especially true when the conditioned space does not contain chutes which direct conditioned air to different locations of the conditioned space. Thus, it would be desirable, and it is an object of the present invention, to improve temperature uniformity throughout a conditioned space in refrigeration systems in which a refrigeration unit includes a refrigerant compressor and evaporator fan driven at first and second speeds by a prime mover in response to a set point temperature control algorithm.

SUMMARY OF THE INVENTION

Briefly, the present invention is a method of operating a refrigeration unit having a refrigerant compressor and an evaporator fan which circulates air between an evaporator coil and a conditioned space, with the compressor and evaporator fan being driven by a prime mover in selectable low and high speed modes in response to a set point temperature control algorithm which maintains the temperature of the conditioned space in a predetermined temperature range adjacent to a selected set point temperature. The method includes the steps of providing a forced high speed mode of the prime mover which periodically forces the prime mover to the high speed mode notwithstanding the selection of the low speed mode by the set point temperature control algorithm. The method further includes the steps of providing a predetermined constant value which determines when the prime mover should be forced to run in the forced high speed mode, comparing the predetermined constant value with a predetermined parameter of the refrigeration unit, and forcing the prime mover to operate in the high speed mode in response to a predetermined result of the comparison step, to increase the air flow rate and velocity of the evaporator fan and improve temperature uniformity in the conditioned space.

The method includes operating the prime mover in a continuous mode, or in a cycling start-stop mode, as desired. When the continuous operating mode is selected, the step of providing a predetermined constant value indicates first and second time values and the predetermined parameter of the refrigeration unit is accumulated operating time. When the prime mover is operating in the low speed mode, the accumulated operating time is time in the low speed mode, and the predetermined result of the comparison step is accumulated low speed operating time equaling the first time value. Such equality establishes the minimum length of time the prime mover will operate in the low speed mode before being forced to the high speed mode. When the prime mover is operating in the forced high speed mode, the accumulated operating time is operating time in the high speed mode, and the predetermined result of the comparison step is the accumulated high speed operating time equaling the second time value. Such equality establishes the minimum desired length of time the prime mover will operate in the forced high speed mode.

When the cycling start-stop mode is selected, the prime mover is stopped when predetermined null conditions are met, to enter a null cycle, and the prime mover is started when the predetermined null conditions are no longer met. In a cycling start-stop operating mode, the predetermined parameter of the refrigeration system is preferably a null cycle, and the method includes the step of counting the null cycles. The step of providing a predetermined constant value indicates a number N, the comparison step compares the count of null cycles with the number N, with the predetermined result of the comparison step being equality. The method thus includes the step of operating the prime mover in the forced high speed mode after every N null cycles.

In a cycling start-stop operating mode, the method of includes the step of terminating an operating cycle of the prime mover when the conditions for entering a null cycle are met, without regard to whether the operating cycle is a forced high speed cycle.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
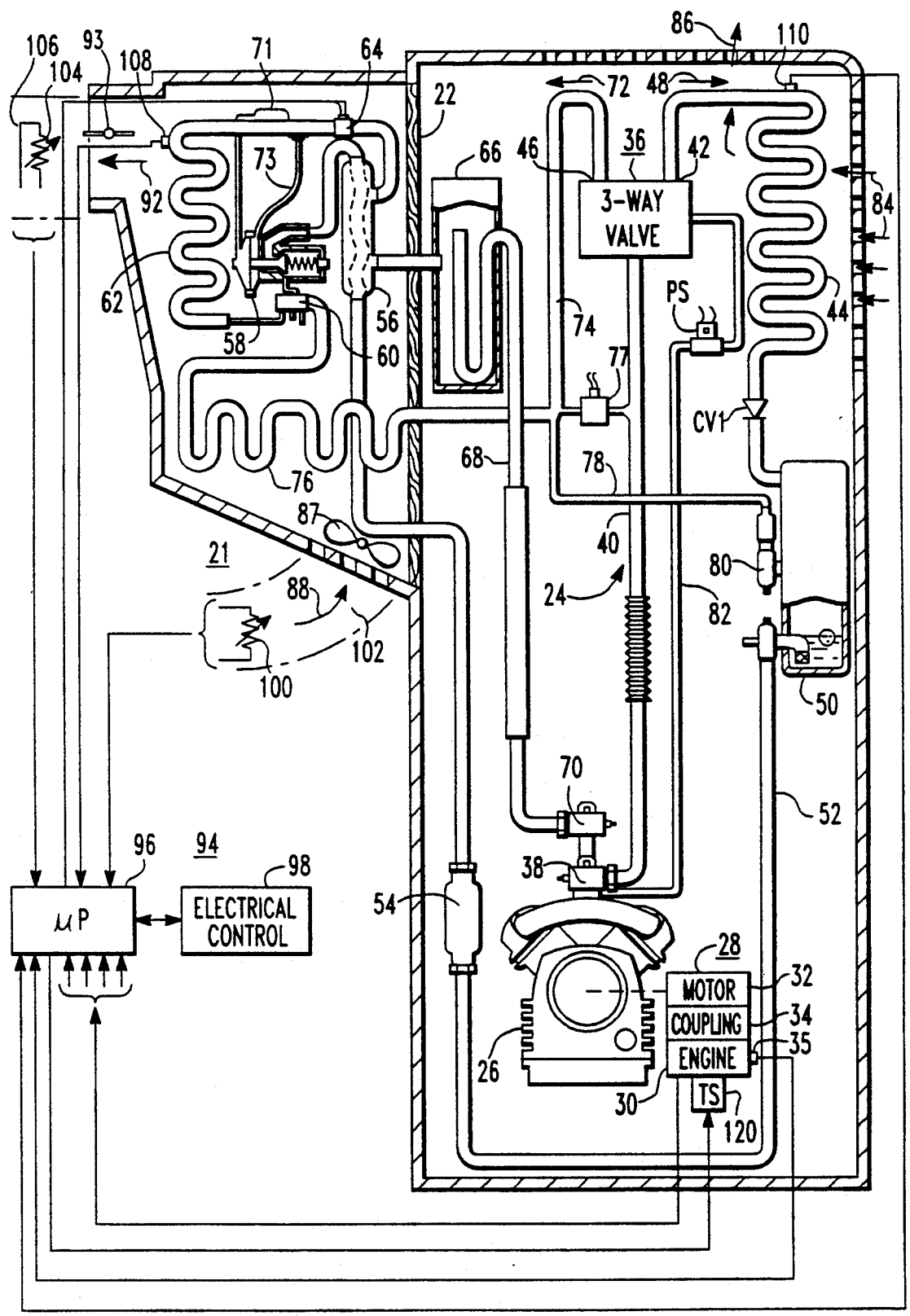
FIG. 1 is a partially block and partially schematic diagram of a refrigeration unit which may utilize the methods of the invention.

Referring now to the drawings, and to FIG. 1 in particular, there is shown a refrigeration unit 20 which may utilize the methods of the invention. Refrigeration unit 20 controls the temperature of a conditioned space 21 to a predetermined temperature range adjacent to a selected set point temperature, as will be hereinafter explained. Refrigeration unit 20 is especially suitable for use in transport applications, and as such may be mounted on a container, truck, or trailer, such as on a wall 22 thereof, for example. Refrigeration unit 20 has a closed fluid refrigerant circuit or flow path 24 which includes a refrigerant compressor 26 driven by a prime mover arrangement 28. Prime mover arrangement 28 includes an internal combustion engine 30, and an optional stand-by electric motor 32. Engine 30 and motor 32, when both are utilized, are coupled to compressor 26 by a suitable clutch or coupling 34 which disengages engine 30 while motor 32 is operative. A selector 174 shown in FIG. 2A selects one of the two prime movers and provides an output on conductor 35 to identify the selection.

Engine 30 is selectively operable at one of at least first and second operating speeds, which will be respectively called high and low speed, which, for example, may be 2200 RPM and 1400 RPM. The speed selection is normally made by a set point temperature control algorithm, such as the set point temperature control algorithms shown in FIGS. 3 and 4. A set point temperature control algorithm, as will be hereinafter described, selects the operating speed of engine 30 by controlling a high speed relay 162 and high speed solenoid 120 shown in FIG. 2B.

Discharge ports of compressor 26 are connected to an inlet port of a three-way valve 36 via a discharge service valve 38 and a hot gas line 40. The functions of three-way valve 36, which selects heating and cooling cycles, may be provided by two separate valves, if desired. Three-way valve 36 has a first outlet port 42, which is selected to initiate a cooling cycle, with the first outlet port 42 being connected to the inlet side of a condenser coil 44. Three-way valve 36 has a second outlet port 46, which is selected to initiate a heating cycle, as will be hereinafter described.

When three-way valve 36 selects the cooling cycle outlet port 42, it connects compressor 26 in a first refrigerant flow path 48, which in addition to condenser coil 44, includes a one-way condenser check valve CV1, a receiver 50, a liquid line 52, a refrigerant drier 54, a heat exchanger 56, an expansion valve 58, a refrigerant distributor 60, an evaporator coil 62, an optional controllable suction line modulation valve 64, another path through heat exchanger 56, an accumulator 66, a suction line 68, and back to a suction port of compressor 26 via a suction line service valve 70. The operative prime mover may be protected against overload by controlling modulation valve 64 to provide the function of a conventional compressor throttling valve, as taught by U.S. Pat. No. 4,977,751, which is assigned to the same assignee as the present application; or, a conventional compressor throttling valve may be disposed in suction line 68, as desired. Expansion valve 58 is controlled by a thermal bulb 71 and an equalizer line 73.

When three-way valve 36 selects the heating cycle outlet port 46, it connects compressor 26 in a second refrigerant flow path 72. The second refrigerant flow path 72 by-passes condenser coil 44 and expansion valve 58, connecting the hot gas output of compressor 26 to the refrigerant distributor 60 via a hot gas line 74 and a defrost pan heater 76. A hot gas by-pass solenoid valve 77 may optionally be disposed to inject hot gas into hot gas line 74 during a cooling cycle. A by-pass or pressurizing line 78 connects hot gas line 74 to receiver 50 via by-pass and check valves 80, to force refrigerant from receiver 50 into an active refrigerant flow path during heating and defrost cycles.

A conduit or line 82 connects three-way valve 36 to the low pressure side of compressor 26 via a normally closed pilot solenoid valve PS. When solenoid valve PS is de-energized and thus closed, three-way valve 36 is spring biased to select the cooling cycle outlet port 42. When evaporator coil 62 requires defrosting, and when a load being conditioned in conditioned space 21 requires heat to maintain set point, pilot solenoid valve PS is energized and the low pressure side of compressor 26 operates three-way valve 36 to select the heating cycle outlet port 46 to initiate a heating cycle or a defrost cycle.

A condenser fan or blower (not shown), which may be driven by prime mover arrangement 28, causes ambient air 84 to flow through condenser coil 44, with the resulting heated air 86 being discharged to the atmosphere. An evaporator fan or blower 87 draws air 88, called "return air", from conditioned space 21, through the evaporator coil 62, and the resulting cooled or heated air 92, called "discharge air", is returned or discharged into conditioned space 21. During an evaporator defrost cycle a defrost damper 93 may be operated to close the discharge air path to conditioned space 90.

Evaporator fan 87 is driven by prime mover arrangement 28, and thus when engine 30 is the operative prime mover, the volume and velocity of the air mover between evaporator coil 62 and conditioned space 21 depends upon whether engine 30 is operating at low or high speed. According to conventional set point temperature control algorithms, such as those shown in FIGS. 3 and 4, operation of engine 30 in the high speed mode will normally occur only during initial temperature pull down of conditioned space 21. Thereafter, engine 30 will be operated in the low speed mode, except during extreme ambient temperature conditions. Thus, operation of evaporator fan 87 will normally be at the speed it is driven by the low speed mode of engine 30.

The lower of the two fan operating speeds may not maintain the desired uniformity of temperature distribution throughout conditioned space 21. This is especially true in transport refrigeration applications in which the conditioned space 21 is devoid of special air directing chutes arranged to distribute the discharge air 92 in a manner which promotes temperature uniformity. The present invention is directed to methods for improving temperature uniformity throughout conditioned space 21, as will be hereinafter described in detail.

Figure 2A:
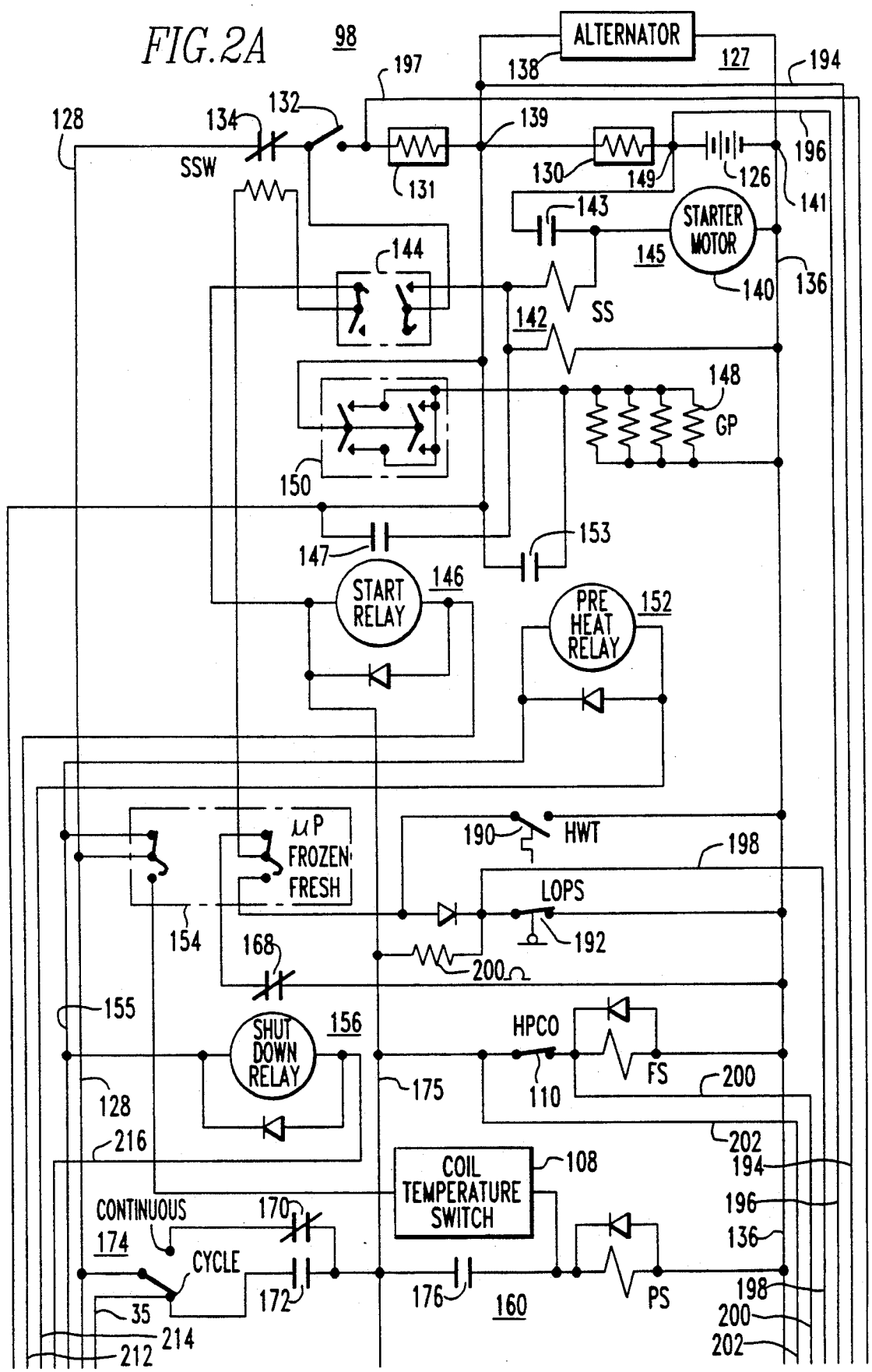
FIGS. 2A and 2B may be assembled to provide an electrical schematic diagram of microprocessor based electrical control shown in block form in FIG. 1.
Figure 2B:
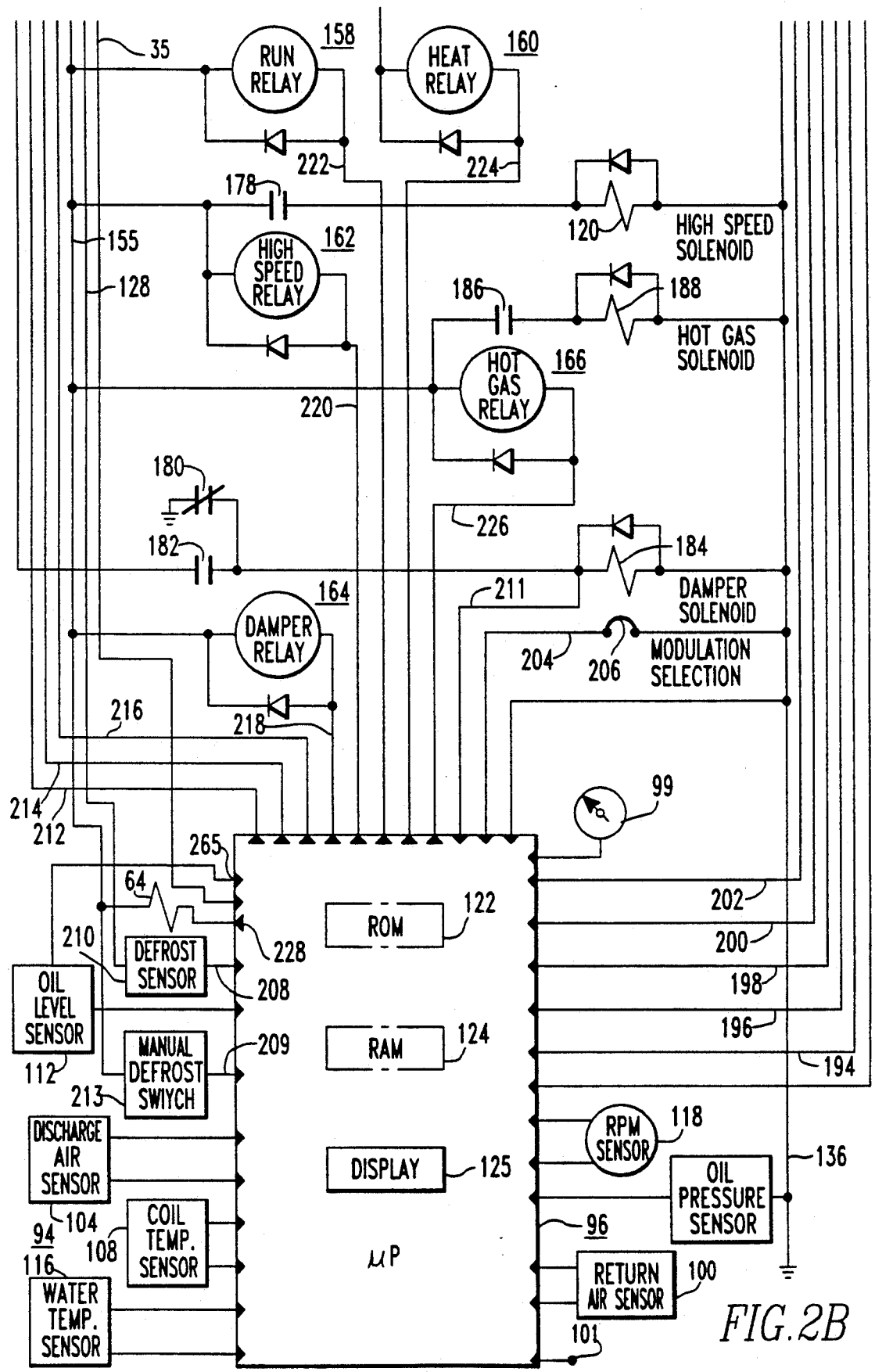

Transport refrigeration unit 20 is controlled by electrical control 94 which includes a microprocessor based controller 96 and electrical control circuits and components 98. Electrical control circuits and components 98 includes relays, solenoids, and the like, as will be explained relative to FIGS. 2A and 2B. As shown in FIGS. 1, 2A and 2B, controller 96 receives input signals from appropriate sensors, including inputs from: a set point temperature selector 99 which may be manually actuated to select the desired temperature of conditioned space 21; an ambient air temperature sensor 101; a return air temperature sensor 100 disposed in a suitable return air path 102; a discharge air temperature sensor 104 disposed in a suitable discharge air path 106; a coil temperature sensor and switch 108 disposed to sense the temperature of the evaporator coil 62; a refrigerant pressure sensor (HPCO) 110 disposed on the high side of the refrigerant flow path 24; and from various engine sensors shown in FIG. 2B. Such engine sensors, for example, may include an oil level sensor 112, an oil pressure sensor 114, an engine coolant temperature sensor 116, and an engine speed sensor 118.

Controller 96, among other things, controls modulation valve 64, hot gas valve 77, and a throttle or high speed solenoid 120 which selects the hereinbefore mentioned high and low operating speeds of engine 30. Other functions controlled by controller 96 are shown in FIGS. 2A and 2B, and will be hereinafter described.

FIGS. 2A and 2B may be assembled to provide a detailed schematic diagram of electrical control 94, which includes microprocessor based controller 96 and control circuits and components 98. As is well known, controller 96 includes a read-only-memory (ROM) 122 for storing programs to be hereinafter described, and a random-access-memory (RAM) 124 for software timers, flags, input signals, output signals, and other variables generated by the operating programs. Controller 96 also includes a display 125 for displaying fault codes, for flashing an alarm icon or indicator, for displaying system status via status lights, and the like.

Electrical control circuits and components 98 include a source of potential or power supply 127 having first and second conductors 128 and 136, respectively. Power supply 127 includes a battery 126 which has one side connected to the first power supply conductor 128 via a first DC current measuring shunt 130, which is used to measure battery charge and discharge current, and a second DC current measuring shunt 131, which may be used to measure the current draw of the control circuit and components connected to the power supply conductors 128 and 136, as described in application Ser. No. 08/046,314, filed Apr. 15, 1993. Control 98 further includes an on-off switch 132, and normally closed contacts 134 of a protective reset switch SSW. The remaining side of battery 126 is connected to the second power supply conductor 136, which is grounded. Power supply 127 further includes a generator or alternator 138 driven by prime mover arrangement 28, with the generator or alternator 138 being connected from a junction point 139 between current shunts 130 and 131 to a junction point 141 on grounded conductor 136. Thus, junction points 139 and 141 form output terminals of power supply 127 which provide a voltage and current to the circuits and components connected thereto.

Control 98 also includes engine starting apparatus 145 for engine 30, with engine starting apparatus 145 having a portion which is connected directly to battery 126, eg., to a junction 149 between the battery shunt 130 and battery 126, and a portion which is connected to power supply output terminal 139. More specifically, the portion of starting apparatus 145 which is connected to junction 149 includes a starter motor 140 which is controlled by a starter solenoid 142 having associated normally open contacts 143, an ignition switch 144, and a start relay 146 having associated normally open contacts 147. The portion of starting apparatus 145 which is connected to power supply output terminal 139, to enable current draw to be measured by the battery shunt 130, includes engine pre-heat control, including glow plug resistors (GP) 148, a pre-heat switch 150 and normally open contacts 153 of a pre-heat relay 152.

Control 98 also includes a three-position switch 154 which has two banks of three terminals each comprising a center terminal and upper and lower terminals, with reference to FIG. 2A. Switch 154, in the illustrated upper position which connects the center terminal to the upper terminal, places unit 20 under control of controller 96. The upper position provides voltage from conductor 128 to a conductor 155. An intermediate position of switch 154, in which the center terminal is not connected to either the upper terminal or the lower terminal, is selected when controller 96 is not utilized and the load in the conditioned space 21 is frozen. This switch position will cause unit 20 to operate continuously in a low speed cool mode LSC. The lower position of switch 154 is selected when controller 96 is not utilized and the load in conditioned space 21 is nonfrozen. This position of switch 154 will cause unit 20 to operate continuously, switching between heating and cooling cycles under the control of the hereinbefore mentioned coil temperature sensor and switch 108. Coil temperature sensor and switch 108 is preset to close at a predetermined coil temperature, such as 35° F. (1.7° C.), to energize the pilot solenoid PS and initiate a heating cycle, and to open at a predetermined higher temperature, such as 38° F. (3.3° C.), to de-energize pilot solenoid PS and initiate a cooling cycle.

In addition to the control devices or relays already mentioned, control 98 includes control devices in the form of a shutdown relay 156, a run relay 158, a heat relay 160, a high speed relay 162, a defrost damper relay 164, and a hot gas relay 166. Shutdown relay 156 is normally energized, and is de-energized to shut unit 20 down via its associated set of normally-closed contacts 168 which ground the protective switch SSW and cause it to open its contacts 134. Run relay 158 has normally open contacts 172 connected to a mode selector switch 174 which has an input connected to conductor 128. Selector switch 174 selects either: (1) a continuous operating mode in which a prime mover of arrangement 28 operates continuously; or, (2) a cycling start-stop operating mode, which includes starting and stopping a prime mover of the prime mover arrangement 28. The selection is communicated to an input of controller 96 via conductor 35.

Figure 4:
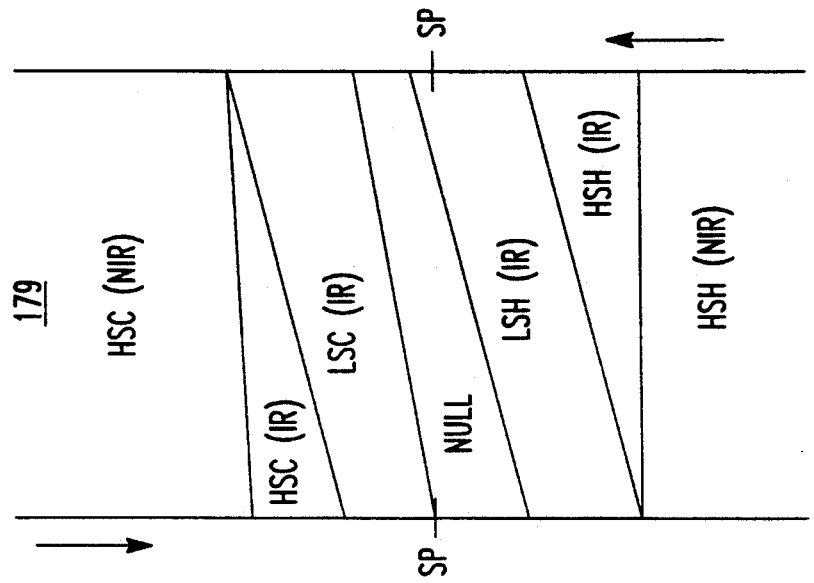
FIG. 4 is a typical set point temperature control algorithm for a refrigeration unit in which the refrigerant compressor is driven in a cycling, start-stop mode, stopping to enter a null cycle when predetermined null conditions are met, and starting to terminate a null cycle when the null conditions are no longer satisfied.
Figure 3:
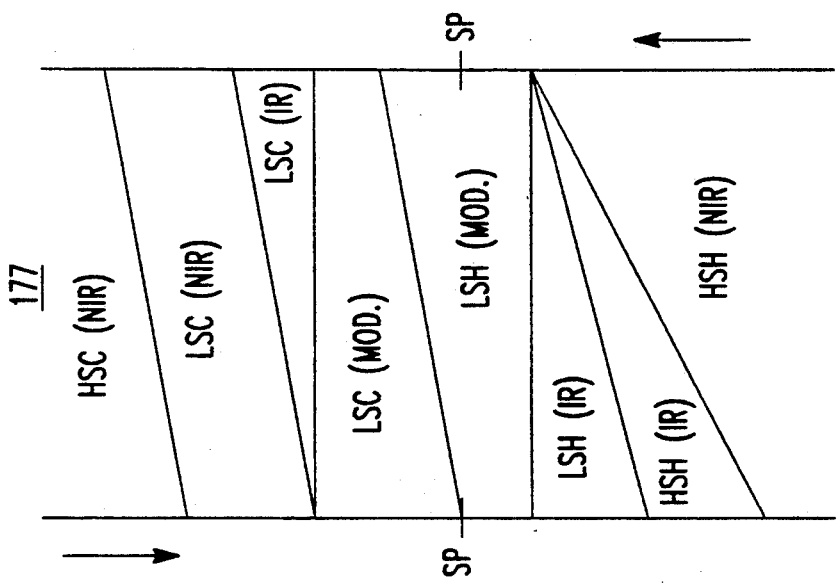
FIG. 3 is a typical set point temperature control algorithm for a refrigeration unit in which the refrigerant compressor is driven continuously by a prime mover.

FIGS. 3 and 4 are typical set point temperature control algorithms which may be used to control the operation of refrigeration unit 20, with FIG. 3 illustrating an algorithm 177 for controlling refrigeration unit 20 when engine 30 is operated in the continuous operating mode, and with FIG. 4 illustrating an algorithm 179 for controlling refrigeration unit 20 when engine 30 is operated in the cycling start-stop operating mode. The downwardly pointing arrow on the left hand side of each algorithm illustrates operation with a falling temperature in conditioned space 21, and the upwardly pointing arrow on the right hand side of each algorithm illustrates operation with a rising temperature in conditioned space 21.

Contacts 172 provide voltage to a conductor 175 from conductor 128 and mode selector switch 174. Run relay 158 must be energized to enable the starting and running of refrigeration unit 20 via engine 30. When unit 20 is started, control 98 is arranged to normally start operation in a predetermined operating mode, which in the exemplary embodiment is a low speed cool (LSC) cycling operating mode. The LSC operating mode is selected by the de-energized position of heat relay 160, which selects a cooling cycle, and by the de-energized position of high speed relay 162, which selects the lower of two operating speeds of engine 30. The present invention may maintain the feature of starting engine 30 in the LSC mode, with certain cycle starts being thereafter switched to a forced high speed mode, as will be hereinafter explained.

Heat relay 160 has a set of normally open contacts 176 for controlling the pilot solenoid PS. High speed relay 162 has a set of normally open contacts 178 for controlling the high speed solenoid 120. Damper relay 164 has a set of normally closed contacts 180 and a set of normally open contacts 182, connected to control a defrost damper solenoid 184 which is linked to defrost damper 93. Hot gas relay 166 is provided for controlling the hot gas valve 77 via a set of normally open contacts 186 and a solenoid 188.

Control 98 also includes a engine coolant temperature switch (HWT) 190, which closes when the engine coolant reaches a predetermined elevated temperature, and a low oil pressure switch (LOPS) 192 which is open as long as engine oil pressure is normal. The closing of either switch 190 or 192 will shut unit 20 down via the manual reset switch SSW.

Controller 96 senses the voltage across the battery shunt 130 via conductors 194 and 196, and can thus determine the magnitude and polarity of battery current. One polarity, which will be called positive, indicates the battery 126 is being charged by alternator 138, which also indicates the prime mover 28 is running. The other polarity, i.e., negative, indicates battery 126 is discharging.

Controller 96 senses the voltage across the control shunt 131 via conductors 197 and 194. Controller 96 can thus determine the magnitude of the current draw provided by the source of potential 127, comprised of battery 126 and alternator 138, to the various components selectively connected by controller 96 between conductors 128 and 136.

Controller 96 also has a conductor 198 which senses the position of the low oil pressure switch 192, conductors 200 and 202 which sense the voltage level on first and second sides, respectively, of the high refrigerant pressure cut-out switch 110, a conductor 204 which senses whether or not a modulation valve selector jumper 206 has connected conductor 204 to system ground 136, a conductor 208 which senses whether or not a defrost sensor switch 210 has operated, signifying the need for a defrost cycle, a conductor 211 which detects voltage on he damper solenoid 184, and a conductor 209 which senses when a manually operated defrost switch 213 has been actuated to request a defrost cycle.

Controller 96 has a plurality of output conductors or drive lines for controlling the energization and de-energization of a plurality of control devices, including conductors 212, 214, 216, 218, 220, 222, 224 and 226 for respectively controlling the operation of start relay 146, pre-heat relay 152, shutdown relay 156, damper relay 164, high speed relay 162, run relay 158, heat relay 160, and hot gas relay 166. A conductor 228 is also provided for controlling the current level in modulation valve 64.

As the various functions performed by controller 96 are described, only those necessary to understanding the invention will be described in detail. Certain of the functions shown in block form, may be described in detail and claimed in U.S. Pat. Nos. 5,123,252; 5,123,253; 5,140,825; and 5,140,826, which are assigned to the same assignee as the present application.

As hereinbefore stated, FIG. 3 illustrates a typical set point temperature control algorithm 177 for operating refrigeration unit 20 when selector switch 174 selects the continuous operating mode. During initial temperature pull down of conditioned space 21 refrigeration unit 20 operates in a high speed cool, not-in range mode HSC(NIR).

As the control error based upon the difference between the selected set point temperature SP and the temperature RA of the return air 88 is reduced, a point is reached where unit 20 switches to a low speed cool, not-in-range operating mode LSC(NIR). Further reduction in the control error results in a low speed cool mode LSC, which includes suction line modulation when jumper 206 in FIG. 2B is in-place. Suction line modulation is normally selected when a fresh, ie., an non-frozen load, is to be conditioned in conditioned space 21.

Should the temperature of conditioned space drop below the set point temperature, unit 20 switches to a low speed heat mode LSH, which may also include suction line modulation. If the control error increases further in the heating mode, requiring still more heat to return conditioned space 21 towards the set point temperature SP, unit 20 will operate in a low speed heat, in-range mode LSH(IR), without modulation. In an extremely cold ambient, the control error may dictate a switch to a high speed heat, in-range mode HSH(IR), and even to a high speed heat, not-in-range mode HSH(NIR).

With a rising temperature in conditioned space, operation in any of the modes HSH(NIR), HSH(IR) or LSH(IR) continues until switching to the low speed heat mode LSH, with modulation, if modulation is selected. With a continued rise in temperature in conditioned space 21, the LSH(IR) mode switches to LSC, with modulation, if modulation is selected, the LSC mode with modulation switches to LSC(IR) without modulation, the LSC (IR) mode switches to LSC(NIR), and in the event of an extremely high ambient temperature, the LSC(NIR) mode switches to HSC(NIR).

Usual operation after pull down, however, will find unit 20 in either LSC or LSH, with modulation, if selected. Thus, air flow will be at the rate and velocity associated with the low operating speed of engine 30.

As hereinbefore stated, FIG. 4 illustrates a typical set point temperature control algorithm 179 for operating refrigeration unit 20 when selector switch 174 selects the cycling start-stop operating mode. During initial temperature pull down of conditioned space 21 refrigeration unit 20 starts in a high speed cool, not-in range mode HSC(NIR), and progressively operates in HSC(IR) and LSC(IR) until conditions for entering a null cycle are met. The null conditions typically include the temperature RA of the return air 88 being at or below the selected set point temperature SP, the temperature of the engine coolant being above a predetermined value, and the charging current of the battery 126 being below a predetermined value, such as described in detail in the hereinbefore mentioned U.S. Pat. No. 5,140,826.

Should the null conditions no longer be satisfied, including the requirement of heat to return the conditioned space towards set point SP, unit 20 will restart in a LSH(IR) mode, and if this mode cannot provide enough heat, the LSH(IR) mode will switch to HSH(NIR).

Upon a rising temperature condition in conditioned space, starting with the HSH(NIR) mode, the unit will switch to HSH(IR) and LSH(IR), before entering a null cycle. If the null conditions are broken with the conditioned space 21 requiring cooling, unit 20 will start in the LSC(IR) mode, and if necessary during extremely hot ambient conditions, switch to HSC(NIR). Thus, in the cycling mode, unit 20 will normally be LSC(IR), NULL, or LSH(IR), all with the evaporator fan air volume and velocity associated with the low speed of engine 30.

Figures 5, 6:
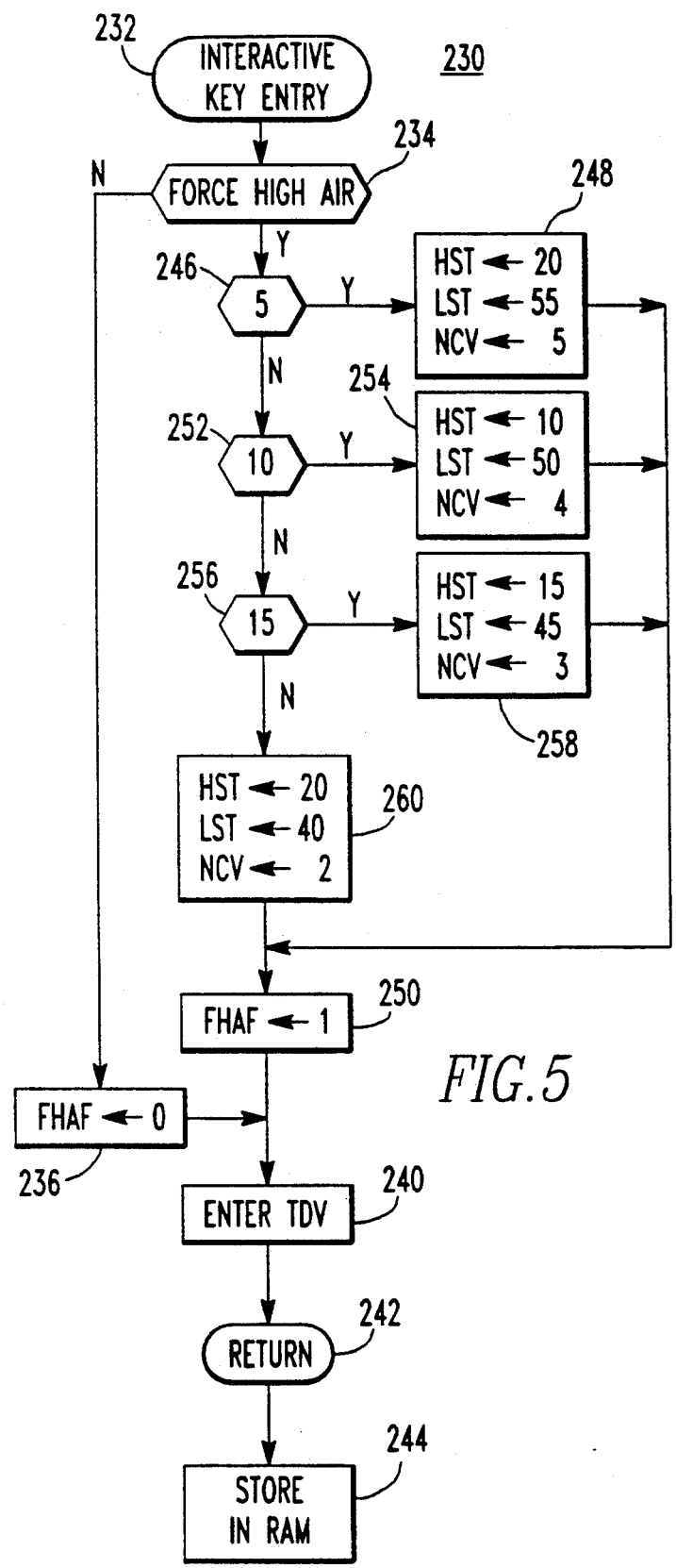
FIG. 5 is a flow diagram of an interactive key entry program which enable a user to enter predetermined constant values which control the operation of the refrigeration unit shown in FIG. 1 according to the methods of the invention.
FIG. 6 is a RAM map which lists certain flags, timers, sensor values, counters, and other variables, generated in the programs of FIGS. 5, 7A, 7B and 8.

FIG. 5 is a flow diagram of an interactive program 230 which enables a user to select and enable a forced high speed mode to improve the uniformity of temperature distribution in conditioned space 21, overriding the calling for a low speed operating mode by a set point temperature control algorithm. Program 230 also enables the user to select a single constant value, which determines when unit 20 will be forced to high speed, regardless of the position of selector switch 174. The constant value selected by the user is interpreted differently, depending upon the position of selector switch 174. In general, when selector switch 174 selects continuous operation of engine 30, the selected constant value determines the minutes per hour that the unit will be forced to high speed after the initial temperature pull down of conditioned space; and, when the selector switch 174 selects cycling operation of engine 30, the selected constant value determines which operating cycles, after the initial temperature pull down cycle of conditioned space 21, will be operated in the forced high speed mode.

More specifically, program 230 is preferably entered with a key for security, as indicated at 232, and step 234 asks if the user desires that the forced high air mode, ie., forced high operating speed of engine 30, is to be enabled. If the user desires to disable a previously selected forced high air speed mode, the user enters "no", and step 234 proceeds to step 236 which resets a forced high air flag FHAF. Flag FHAF is maintained in RAM 124, with FIG. 6 illustrating a RAM map 238 which contains mnemonics of the various flags, constants, timers, counters, sensors, and variables utilized in program 230 and the programs of FIGS. 7A, 7B and 8.

Program 230 may also be used to allow the user to enter a time value which will periodically initiate a timed defrost cycle of the evaporator coil 62. Accordingly, step 236 enters a step 240 which requests the user to enter a time value TDV. Step 242 stores the timed defrost value TDV in RAM 124, and program 230 exits at 244.

Should the user indicate that the forced high air mode be enabled in step 234, program 230 asks the user if a first predetermined constant value, such as "5" is desired, The first predetermined constant value "5" is associated with the lowest percentage of operating time of unit 20 in the forced high speed mode. If the user indicates that the first predetermined constant value "5" is selected, it is interpreted as requesting, when unit 20 is operating in a continuous mode, that engine 30 be forced to operate in the high speed mode for a minimum of 5 minutes per hour after initial temperature pull down, and when unit 20 is operating in a cycling start-stop mode that engine 30 be operated at high speed every fifth cycle, after initial temperature pull down. If the user selects "5" in step 246, step 248 stores, in RAM 124, a high speed time HST of 5 minutes and a low speed time LST of 55 minutes, for use when engine 30 is operated continuously, and a null count value NCV of 5, for use when engine 30 is operated in a cycling start-stop mode. Step 248 then proceeds to step 250 which sets flag FHAF, to indicate enablement of the forced high speed mode. Step 250 then proceeds to the hereinbefore described step 240.

If the user does not select "5", step 246 proceeds to step 252 which asks the user if the value of "10" is desired. If the user selects "10", step 254 stores, in RAM 124, a high speed time HST of 10 minutes, a low speed time LST of 50 minutes, and a null count value NCV of 4. Thus, in the continuous mode, engine 30 will, after pull down, nominally operate in the forced high speed mode for 10 minutes of every hour, and in the low speed mode for 50 minutes. In the cycling mode, engine 30 will operate in the forced high speed mode every fourth cycle after pull down. Step 254 proceeds to the hereinbefore described step 250.

If the user does not select "10", step 252 proceeds to step 256 which asks the user if the value of "15" is desired. If the user selects "15", step 258 stores, in RAM 124, a high speed time HST of 15 minutes, a low speed time LST of 45 minutes, and a null count value NCV of 3. Thus, in the continuous mode, engine 30 will, after pull down, nominally operate in the forced high speed mode for 15 minutes of every hour, and in the low speed mode for 45 minutes. In the cycling mode, engine 30 will operate in the forced high speed mode every third cycle after pull down. Step 258 proceeds to the hereinbefore described step 250.

If the user does not select "15", step 256 proceeds to step 260 which automatically selects "20", the last value in the example of FIG. 5. Step 260 stores, in RAM 124, a high speed time HST of 20 minutes, a low speed time LST of 40 minutes, and a null count value NCV of 2. Thus, in the continuous mode, engine 30 will, after pull down, nominally operate in the forced high speed mode for 20 minutes of every hour, and in the low speed mode for 40 minutes. In the cycling mode, engine 30 will operate in the forced high speed mode in alternate cycles after pull down. Step 260 proceeds to the hereinbefore described step 250.

Figure 7A:
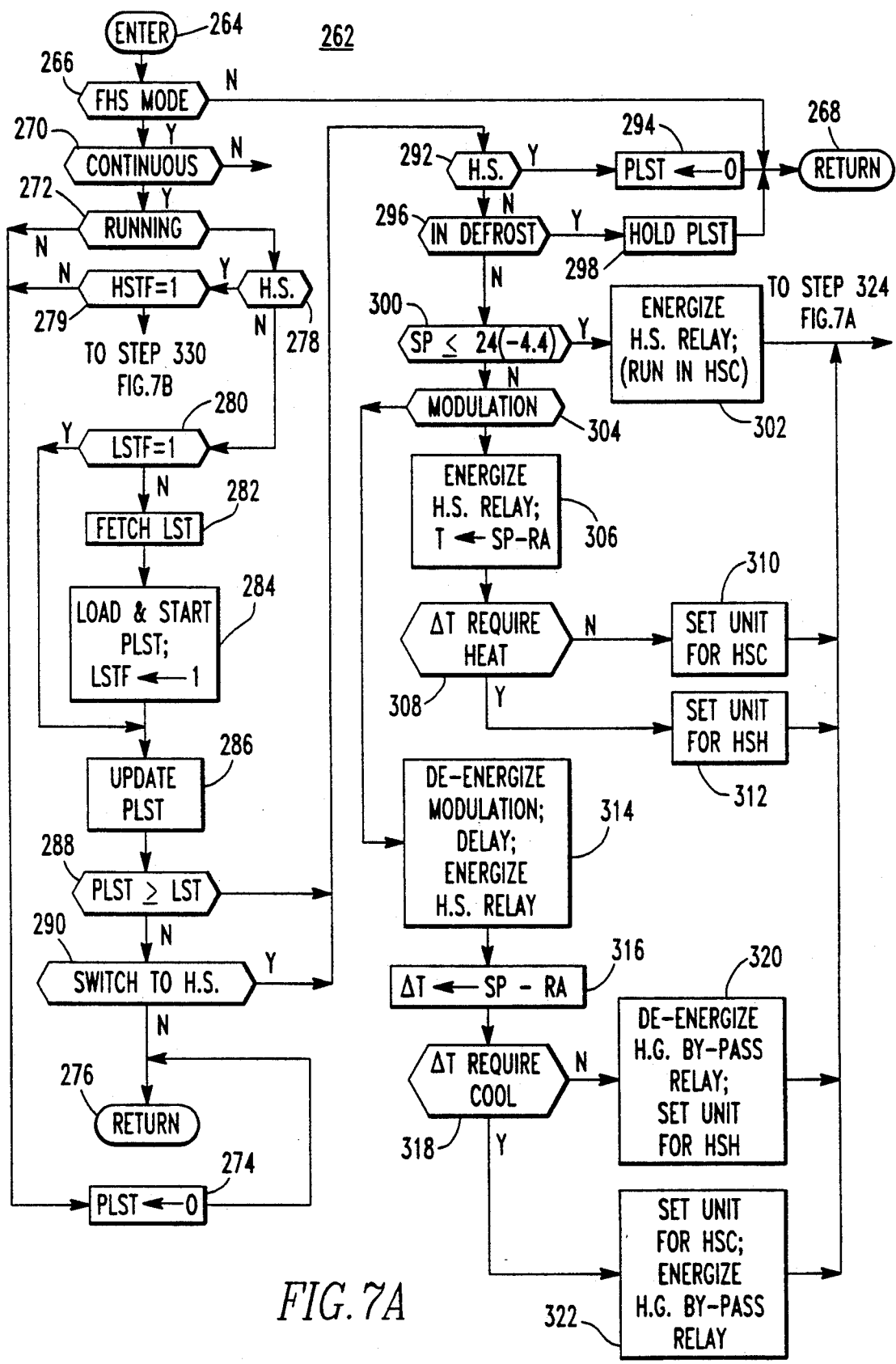
FIGS. 7A and 7B may be assembled to provide a flow diagram of a program which implements the methods of the invention, including when the refrigerant prime mover is operated continuously.
Figure 7B:
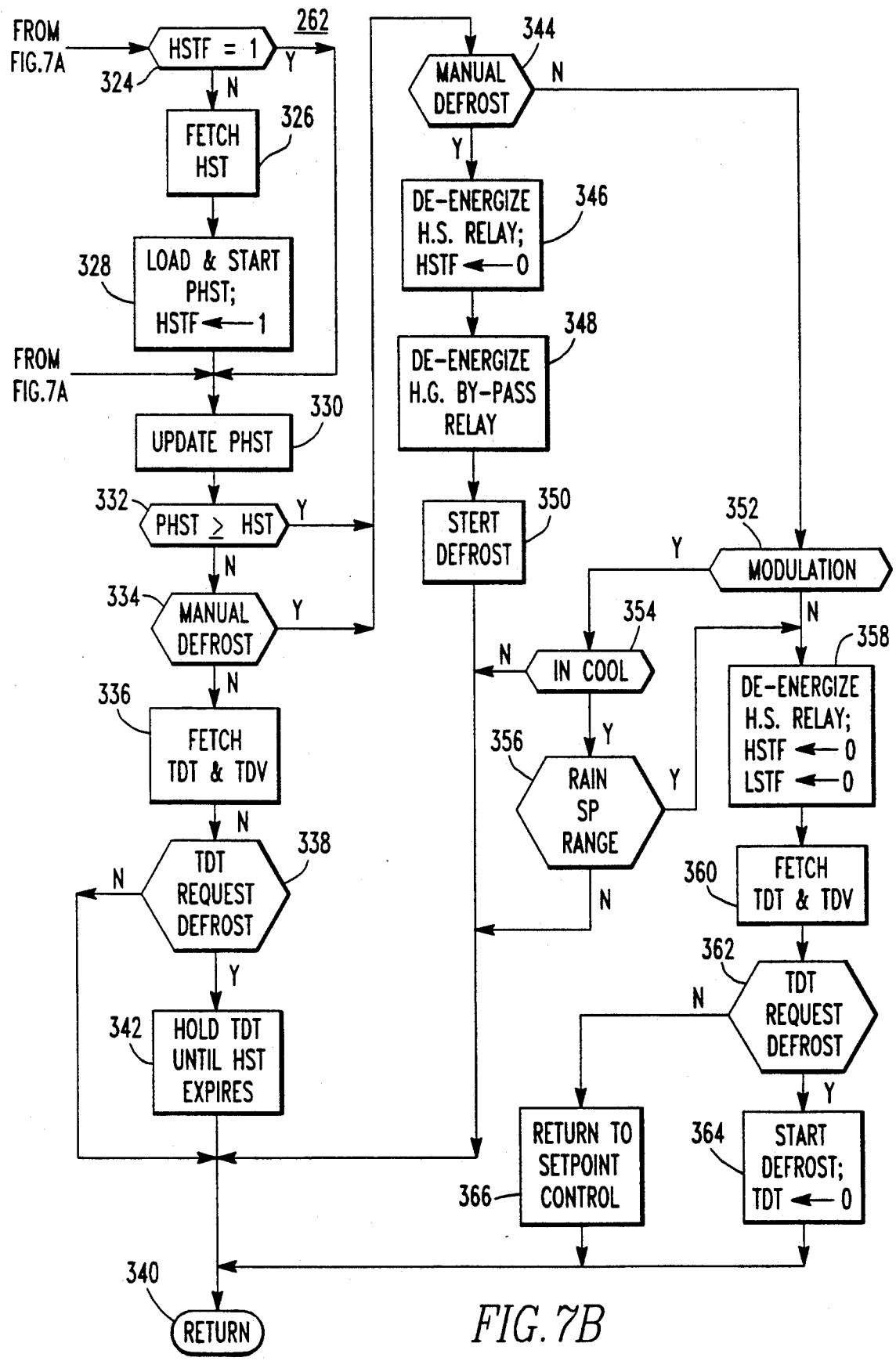

FIGS. 7A and 7B may be assembled to create a flow diagram of a program 262 which further implements the methods of the invention, utilizing the values stored in RAM 124 by program 230. Program 262 is entered at 264 and step 266 determines if the forced high speed mode has been enabled, such as by checking the hereinbefore mentioned flag FHAF. If flag FHAF is found to be reset, the forced high speed is not enabled and step 266 returns to an executive program at 268.

If flag FHAF is found to be set, step 266 proceeds to step 270 which checks the position of selector switch 174 to determine if unit 20 is operating in the continuous or in the cycling start-stop mode. If step 270 finds that the cycling start-stop mode has been selected, step 270 proceeds to FIG. 8, which will be hereinafter described. If step 270 finds the continuous mode has been selected, step 270 proceeds to step 272 which determines if unit 20 is running. If unit 20 is not running, step 272 proceeds to step 274 which sets a programmed low speed timer PLST in RAM 124 to zero, and program 262 exits at 276. If unit 20 is running step 272 goes to step 278 which determines if unit 20 is in the high speed mode, eg., is high speed relay 162 energized? If high speed relay 162 is energized step 279 checks a high speed timer flag HSTF to determine if the high speed running time is being accumulated in a programmed high speed timer PHST in RAM 124. If unit 20 is in high speed and flag HSTF is not set, unit 20 is in initial temperature pull down or some other high speed mode required by the applicable set point temperature control algorithm. The present invention waits until initial temperature pull down, or any other set point demanded high speed cycle, has been completed before monitoring operation of unit 20. Thus, step 279, when flag HSTF is not set, proceeds to the hereinbefore mentioned step 274 to reset the low speed timer PLST, and program 262 exits at 276. If step 279 finds flag HSTF set, the high speed mode is a forced high speed mode, and step 279 proceeds to step 330 in FIG. 7B, which will be hereinafter described.

When step 278 finds unit 20 is not in high speed, initial temperature pull down, or any other set point demanded high speed cycle, has been completed, and step 280 checks a low speed timer flag LSTF in RAM 124 to determine if the low speed timer PLST has been started, ie., enabled to accumulate low speed running time. If flag LSTF is found to be reset, step 280 proceeds to step 282 which fetches the minimum desired low speed running time LST from RAM 124, which was stored in RAM 124 by program 230, and step 284 loads timer PLST with zeros and starts or enables timer PLST by setting flag LSTF.

Step 286 updates timer PLST and step 288 determines if timer PLST has reached the time value LST. At this point in time timer PLST will not be equal to time value LST and step 288 proceeds to step 290 which determines if unit 20 has switched to the high speed mode due to the applicable set point temperature control algorithm. If unit 20 is still in the low speed operating mode, program 262 exits at 276.

Timer PLST will be continually updated on each running of program 262, as step 280 will find flag LSTF set and proceed directly to the timer updating step 286. The timer updating continues until either step 288 finds that timer PLST equals or exceeds time value LST, or step 290 finds unit 20 has switched to the high speed operating mode. The "yes" branches of steps 288 and 290 both proceed to step 292, with step 292 determining which of the two events occurred by checking to determine if unit 20 is in the high speed operating mode. If step 292 finds unit 20 operating in the high speed mode, step 294 resets the low speed timer PLST and program 262 exits at 268.

If step 292 finds unit 20 is not in the high speed mode, then low speed timer PLST has reached the time value LST and it is time to switch to the forced high speed running mode. However, unit 20 is not automatically switched to the forced high speed running mode, as step 296 first determines if unit 20 is in a defrost cycle, defrosting the evaporator coil 62. High speed is not forced when the low speed time expires during a defrost cycle. The forced high speed mode is delayed until expiration of the defrost cycle. Thus, when step 296 finds an active defrost cycle, step 298 maintains the value of the low speed timer PLST and the program exits at 268. Program 262 will continually come back to step 296 until the defrost cycle terminates. When the defrost cycle terminates, step 296 proceeds to step 300 which determines if conditioned space contains a frozen or a non-frozen load, such as by comparing the selected set point temperature SP with a predetermined value, such as 24° F. (−4.4° C.). If the load being conditioned is frozen, step 302 energizes high speed relay via line 220 in FIG. 2B, and unit 20 will automatically run in a high speed cool mode HSC, as heat is automatically locked out when the set point selector 99 is set to a value indicating a frozen load. In every forced high speed mode, a high speed icon in display 125 is flashed. Step 302 proceeds to step 324 in FIG. 7B, which will be hereinafter described.

If step 300 finds a non-frozen load, step 304 determines if suction line modulation has been enabled by checking input line 204 in FIG. 2B, which determines if jumper 206 is in-place. If modulation has not been enabled, step 306 energizes the high speed relay 162. Step 306 also subtracts the temperature RA of the return air 88 from the selected set point temperature SP to provide a difference value $\Delta T$. Step 308 checks the algebraic sign of $\Delta T$ to determine if unit 20 should be run in a high speed cool mode HSC, or a high speed heat mode HSH. If unit 20 requires a cool mode, step 310 sets unit 20 to run in high speed cool by de-energizing heat relay 160 via line 224. If unit 20 requires a heat mode, step 312 sets unit 20 to run in high speed heat by energizing heat relay 160 via line 224. Steps 310 and 312 both proceed to step 324 in FIG. 7B.

If step 304 finds suction line modulation has been enabled, step 314 is entered which de-energizes modulation valve 64 via line 228 and energizes high speed relay 162 via line 220. Step 316 calculates $\Delta T$, and step 318 determines whether to run unit 20 in a heating cycle or a cooling cycle.

If a heating cycle is required, step 318 proceeds to step 320. Step 320 de-energizes hot gas by-pass relay 166 and sets unit 20 for the high speed heat mode by energizing heat relay 160.

If cooling is required, step 318 proceeds to step 322. Step 322 de-energizes heat relay to set unit 20 for high speed cool HSC, and since modulation is enabled, indicating a sensitive non-frozen load which may suffer spot freezing during a high speed cooling mode, it is important to minimize refrigeration capacity during the forced high speed cooling mode. To accomplish a quick reduction in refrigeration capacity and thus maintain a desired small $\Delta D$ between the temperatures RA and DA of the return air 88 and discharge air 92 during the forced high speed cooling mode, hot gas injection into evaporator 62 is utilized. Hot refrigerant from hot gas line 40 is injected directly into evaporator 62, ie., without going through the refrigerant path which includes expansion valve 58. This provides an immediate reduction in refrigeration capacity of about 65%. This dramatic reduction in refrigeration capacity, coupled with maximum air flow results in the desired small ΔD, providing the desired temperature uniformity in conditioned space 21 while preventing temperature changes which may damage the load in conditioned space 21. Accordingly, step 322 energizes the hot gas by-pass relay 166 which energizes solenoid 188 and opens hot gas by-pass valve 77, to inject hot gas into evaporator coil 62 to reduce the cooling rate during the forced high speed running time. Steps 320 and 322 both proceed to step 324 in FIG. 7B.

As hereinbefore stated, steps 302, 310, 312, 320 and 322 all proceed to step 324 in FIG. 7B, and all of these steps proceed from steps which initiated the forced high speed operating mode, which is initiated for high air flow reasons, and not for set point control reasons. Step 324 in FIG. 7B checks flag HSTF to determine if high speed timer PHST has been enabled to accumulate high speed running time. If step 324 finds flag HSTF reset, timer PHST has not been enabled, and step 326 fetches the minimum desired forced high speed running time value HST from RAM 124. Step 328 loads zeros into timer PHST and enables it to accumulate high speed running time by setting flag HSTF.

Step 330 updates the high speed running time timer PHST, and it will be noted that the "yes" branch of step 279 in FIG. 7A, upon finding flag HSTF set, also enters step 330 to update timer PHST. Step 332 compares the value on timer PHST with the stored value HST, and at this point in time the value of PHST will not equal or exceed HST and step 332 proceeds to step 334. Step 334 checks inputs 208 and 209 from defrost sensor 210 and from manual defrost switch 213, respectively, to determine if a defrost cycle based on actual need to defrost has been requested.

If step 334 finds that defrost based on need has not been requested step 336 fetches the value of the timed defrost timer TDT, which is continually updated during the running of unit 20, and the timed defrost value TDV is also obtained from RAM 124. Step 338 compares TDT with TDV to determine if it is time for a defrost cycle. If a timed defrost is not due, the program exits at 340, and if a timed defrost is due, step 342 holds the value of TDT so that a timed defrost cycle can begin as soon as the forced high speed mode terminates. A timed defrost is delayed because it is not based upon an actual sensed need to defrost. A defrost request based on need is not delayed, as will be explained.

On the next running of program 262 step 279 in FIG. 7A or step 324 in FIG. 7B will update timer PHST, and this updating will continue until step 332 finds that HST equals or exceeds the high speed time value HST or step 332 detects a request for a defrost cycle based on actual need. The "yes" branches from steps 332 and 334 both proceed to step 344 which determines which event occurred. Step 344 may check to determine if a defrost cycle based on need has been requested, and if so, the forced high speed cycle is terminated in step 346 by de-energizing high speed relay 162. Since after a defrost operation it would be desirable to run the total desired forced high speed time, step 346 also resets flag HSTF, which will result in the high speed timer PHST being started from zero after the defrost cycle terminates. Timer PLST and flag LSTF are not reset at this time, as they will be used to automatically start the forced high speed mode at the conclusion of the defrost cycle. Step 348 de-energizes hot gas by-pass relay 166, and step 350 initiates the defrost cycle, by operating in a low speed heat mode with high speed relay 162 de-energized, heat relay 160 energized, and damper relay 164 energized. Step 350 exits program 262 at 340.

When step 344 finds that a defrost cycle based on need has not been requested, the minimum desired forced high speed running time has expired and step 344 proceeds to step 352. Step 352 determines if unit 20 is enabled to run with suction line modulation, and if so, the forced high speed running time is not terminated until unit 20 is operating in a cooling cycle and the temperature RA of the return air 88 is within a predetermined range close to the selected set point temperature SP. These two qualifications are performed by steps 354 and 356 when bumper 206 is in place, with step 354 proceeding to program return 340 until finding unit 20 is in a cooling cycle, and with step 356 proceeding to program return 340 until finding that the temperature RA of the return air 88 is the desired range adjacent to set point SP.

When the two qualifications for terminating the forced high speed mode are met, step 356 proceeds to step 358 which de-energizes high speed relay 162 and resets the high speed timer flag HSTF. When step 352 finds that suction line modulation has not been enabled, step 352 proceeds directly to step 358 to immediately terminate the forced high speed operating mode.

Step 358 proceeds to steps 360 and 362, which are similar to steps 336 and 338, with steps 360 and 362 determining if a defrost cycle based on time is due. If the defrost time expired during a forced high speed mode, the time value on timer TDT was held in step 342 so that a defrost cycle based on time could be started immediately upon termination of an active forced high speed cycle. If a timed defrost is due, step 364 initiates a defrost cycle and timer TDT is reset. If step 362 finds no request for a timed defrost cycle, step 366 returns unit 20 to control by the set point temperature algorithm, which is a symbolic step, as unit 20 is automatically under set point control when not overridden by a forced high speed mode.

Program 262 in FIGS. 7A and 7B implements teachings of the invention when selector 174 in FIG. 2A selects the continuous run mode for engine 30. When selector 174 selects the cycling start-stop mode for engine 30, as detected in step 270 of FIG. 7A, program 368 shown in FIG. 8 is entered at 370, to implement teachings of the invention for the cycling start-stop mode.

Figure 8:
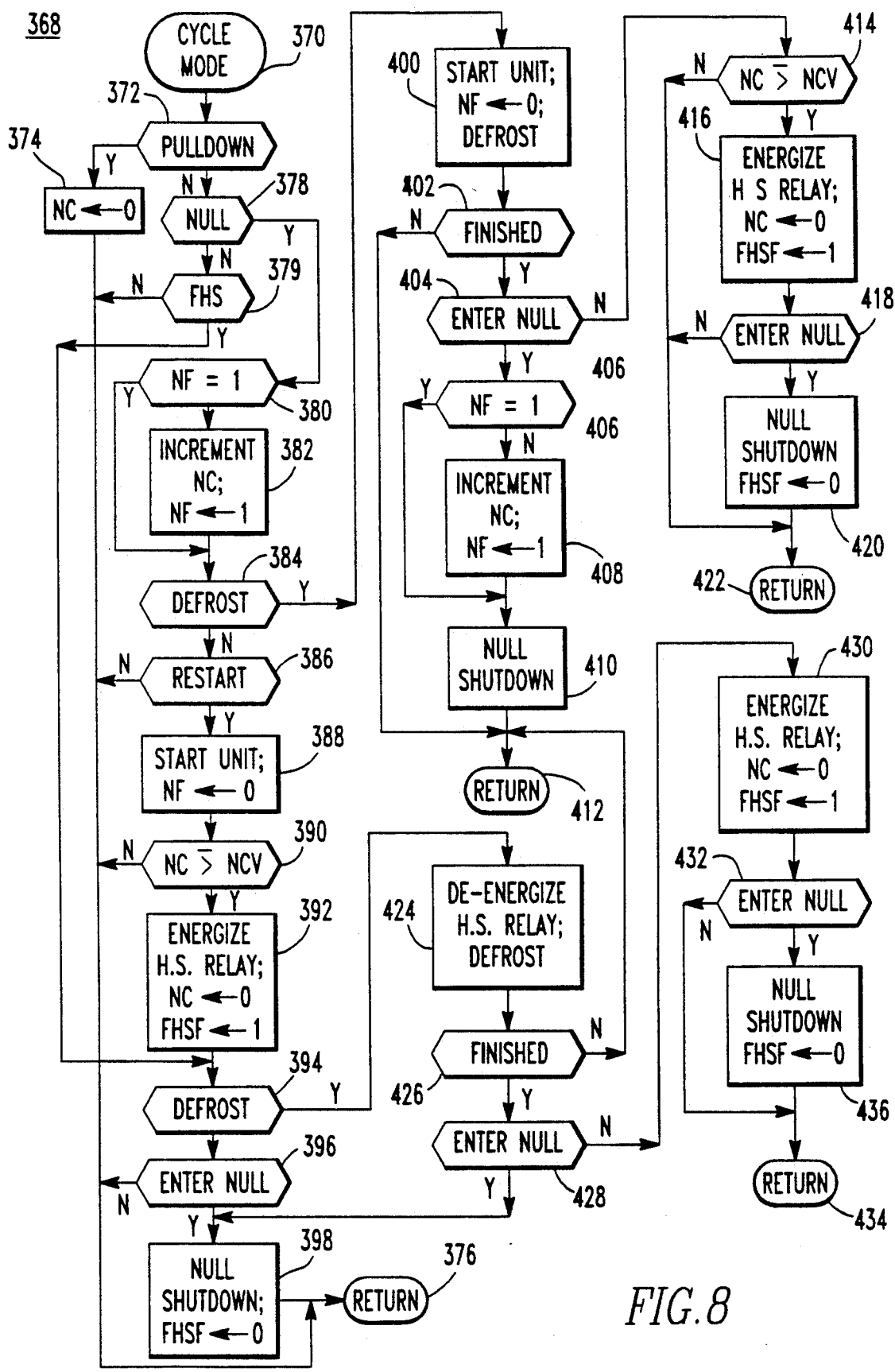
FIG. 8 is a flow diagram called by the program of FIG. 7A when the refrigerant compressor is operated in a cycling start-stop mode, instead of continuously.

Step 372 of FIG. 8 determines if unit 20 is in the initial temperature pull down cycle. For example, when unit 20 is initially started a pull down flag (not shown) may be reset, which is set when the initial pull down cycle terminates and a null cycle is entered. If step 372 finds unit 20 in pull down, step 374 resets a null counter NC to zero, and program 368 exits at 376.

When step 372 finds unit 20 is not in pull down, step 378 determines if unit 20 is in a null cycle. Unit 20 will be in a null cycle with engine 30 off when predetermined null conditions are satisfied, as described relative to algorithm 179 in FIG. 4. If unit 20 is not in a null cycle, step 379 determines if unit 20 is operating in a forced high speed mode by checking a forced high speed flag FHSF in RAM 124. If unit 20 is not operating in a forced high speed mode, step 379 exits program 368 at 376. If unit 20 is operating in a forced high speed mode, step 379 proceeds to a step 394 to be hereinafter described.

If step 378 finds unit 20 in a null cycle, step 380 checks a null flag NF stored in RAM 124 to determine if this null cycle has been counted. If step 380 finds flag NF reset, step 382 increments null counter NC and it sets flag NF so this null cycle will not be counted again. Step 382, and the "yes" branch of step 380, both proceed to step 384 which determines if a defrost cycle based on need has been requested, by checking inputs 208 and 209 in FIG. 2B. If a defrost cycle based on need is not detected in step 384, step 386 determines if unit 20 should be restarted. For example, unit 20 should be restarted when the temperature of conditioned space 21 is no longer in the null range, and unit 20 should also be restarted if it appears that to wait any longer would jeopardize the ability to restart, such as detection of engine coolant temperature below a predetermined value, or detection of battery output voltage below a predetermined value. If unit 20 has no need to restart, step 386 proceeds to program exit 376.

If step 386 finds unit 20 should be restarted, step 388 starts unit 20 and flag NF is reset. The hereinbefore mentioned U.S. Pat. No. 5,140,826 sets forth an engine starting program in detail may be used. Step 390 then retrieves the null count on counter NC and the null count value NCV from RAM 124 and compares them to determine if the null count NC has reached or exceeded the null count value NCV stored in RAM 124 by program 230 in FIG. 5. If the null count NC has not reached the null count value NCV, step 390 exits program 368 at 376.

When step 390 finds that the null count NC has equaled or exceeded value NCV, the current operating cycle should be a forced high speed cycle and step 392 energizes high speed relay 162, the null count NC is reset, and the forced high speed flag FHSF is set. Step 392 proceeds to step 394, as does the "yes" branch of step 379, with step 394 determining if any defrost cycle, based on need or time, is required. If no defrost cycle is required, step 396 determines if the predetermined null conditions have been satisfied. Unlike the continuous mode, which initiates the forced high speed mode based on a time value, and which terminates the forced high speed mode based upon a time value, the cycling mode initiates a cycle based upon actual need to run the engine, and if the cycle count is right, the cycle based on need will be run in the forced high speed mode. The forced high speed cycle will continue until conditions for a null cycle are met, or a request for a defrost cycle is made, based on need or time. Thus, if step 394 finds no defrost cycle request, and step 396 finds conditions for a null cycle are not met, program 368 exits at 376. When step 396 finds that the null conditions have been met, step 398 initiates a null shutdown of engine 30, flag FHSF is reset, and program 368 returns at 376.

Anytime step 384 detects a request for a defrost cycle based on actual need to defrost evaporator coil 62, step 384 branches to step 400 which starts unit 20, resets null flag NF, and initiates a defrost cycle. Step 402 determines when the defrost cycle has terminated. If the defrost cycle has not terminated, step 402 exits program 368 at 412. When the defrost cycle has been completed, step 402 proceeds to step 404 and step 404 determines if the null conditions have been satisfied. If the null conditions have been met, step 406 checks the null flag NF to determine if this null cycle has been counted. If null flag NF is reset, step 406 proceeds to step 408 which increments null counter NC, and null flag NF is set. Step 410 initiates a null shutdown and program 368 exits at 412.

When the defrost cycle terminates and step 404 finds that the null conditions are not satisfied, step 404 proceeds to step 414 which retrieves the null count NC and the null count value NCV and compares them to determine if this cycle which initiated as a defrost cycle should now be converted into a forced high speed cycle. If the null count NC does not equal or exceed the null count value NCV, step 414 exits program 368 at 422. If the null count NC equals or exceeds NCV, step 416 energizes high speed relay 162, the forced high speed flag FHSF is set, and the null count NC is reset. Step 418 determines when the null conditions have been met, exiting program 368 at 422 when they have not been met, and initiating a null shutdown in step 420 when they have been met. Step 420 also resets the forced high speed flag FHSF.

When step 394 detects any request for a defrost cycle during an on-going forced high speed mode cycle, step 394 branches to step 424 which interrupts the forced high speed mode by de-energizing the high speed relay 162 and initiating a defrost cycle. Step 426 determines when the defrost cycle has been completed, and when it has not been completed step 426 exits program 368 at 412. When step 426 finds defrost has been completed, step 428 determines if unit 20 should enter a null cycle. If the null conditions have been satisfied, step 428 proceeds to step 398 which initiates a null shutdown, and step 398 exits program 368 at 376.

When step 426 finds the defrost cycle has terminated, and step 428 finds that the null conditions have not been satisfied, step 428 advances to step 430 which resumes the interrupted forced high speed mode by energizing high speed relay 162. Step 432 determines if the null conditions have been satisfied, exiting program 368 when they have not, and entering step 436 to initiate a null shutdown when they have. Step 436 also resets the forced high speed flag FHSF, and step 436 then exits program 368 at 434.

I claim:

1. A method of operating a refrigeration unit having a refrigerant compressor and an evaporator fan which circulates air between an evaporator coil and a conditioned space, with the compressor and evaporator fan being driven by a prime mover in selectable low and high speed modes in response to a set point temperature control algorithm which maintains the temperature of the conditioned space in a predetermined temperature range adjacent to a selected set point temperature, comprising the steps of:

providing a forced high speed mode of the prime mover which periodically forces the prime mover to the high speed mode notwithstanding the selection of the low speed mode by the set point temperature control algorithm, providing a predetermined constant value which determines when the prime mover is forced to run in the forced high speed mode, comparing the predetermined constant value with a predetermined parameter of the refrigeration unit, and forcing the prime mover to operate in the high speed mode in response to a predetermined result of the comparison step, to increase the air flow rate of the evaporator fan and improve temperature uniformity in the conditioned space.

2. The method of claim 1 including the step of operating the prime mover continuously, and wherein the step of providing a predetermined constant value provides a time value, the predetermined parameter of the refrigeration unit is accumulated operating time in the low speed mode, and the predetermined result of the comparison step is the accumulated low speed operating time equaling the time value, with such equality establishing the minimum length of time the prime mover will operate in the low speed mode before being forced to the high speed mode.

3. The method of claim 2 including the steps of:
providing a defrost cycle to defrost the evaporator coil,
accumulating low speed operating time notwithstanding the unit being in a defrost cycle,
initiating the forced high speed mode when the accumulated low speed operating time equals the time value, when the unit is not in a defrost cycle,
and delaying the initiation of the forced high speed mode until an active defrost cycle terminates, when the accumulated low speed time equals the time value during a defrost cycle.

4. The method of claim 1 including the step of operating the prime mover continuously, and wherein the step of providing a predetermined constant value provides a time value, the predetermined parameter of the refrigeration unit is operating time in the high speed mode, and the predetermined result of the comparison step is the high speed operating time equaling the time value, with such equality establishing the minimum desired time of the prime mover in the forced high speed mode.

5. The method of claim 1 including the step of operating the prime mover continuously, with the step of providing a predetermined constant value providing first and second time values, with the first time value determining the minimum length of time the prime mover will operate in the low speed mode before being forced to the high speed mode, and with the second time value indicating the desired operating time in the forced high speed mode.

6. The method of claim 5 including the step of providing a defrost cycle which is initiated periodically in response to a defrost timer to defrost the evaporator coil, and including the step of delaying the initiation of a defrost cycle until the end of an active forced high speed mode as indicated by the second time value, when the defrost timer indicates defrost is required during an active forced high speed mode.

7. The method of claim 5 including the step of providing a defrost cycle which is based on actual need to defrost the evaporator coil, and including the step of immediately implementing a defrost cycle request based on actual need, notwithstanding an active forced high speed cycle, interrupting an active forced high speed cycle, and returning the prime mover to the low speed mode during the defrost cycle.

8. The method of claim 7 including the step of returning to an interrupted forced high speed mode upon the termination of a defrost cycle based on need, and resetting any high speed operating time accumulated before the interruption, to operate the prime mover in the forced high speed mode for the full second time value after an interruption due to a defrost cycle based on need.

9. The method of claim 5 including the step of providing cooling and heating cycles, and a suction line modulation cycle associated with at least the cooling cycle, in the set point temperature control algorithm, and including the step of:
injecting hot refrigerant into the evaporator coil during a forced high speed cooling mode.

10. The method of claim 5 including the step of providing cooling and heating cycles, and a suction line modulation cycle associated with at least the cooling cycle, in the set point temperature control algorithm, with the second time value indicating the minimum high speed mode operating time when the control algorithm includes a suction line modulation cycle, and including the steps of:
terminating an active modulation cycle when initiating a forced high speed mode,
and terminating the forced high speed mode when:
(a) the minimum high speed mode operating time has expired,
(b) the temperature of the conditioned space is in the predetermined temperature range adjacent to the selected set point temperature, and
(c) the unit is operating in a cooling cycle.

11. The method of claim 10 including the step of:
injecting hot refrigerant into the evaporator coil during a forced high speed cooling mode.

12. The method of claim 1 including the step of providing cooling and heating cycles, and a suction line modulation cycle associated with at least the cooling cycle, in the set point temperature control algorithm, and including the step of:
injecting hot refrigerant into the evaporator coil during a forced high speed cooling mode.

13. The method of claim 1 wherein the prime mover is selectably operable in either a continuous mode or in a cycling start-stop mode, and including the step of selecting one of the operating modes, with the step of providing a predetermined constant value indicating minutes per hour it is desired to operate the prime mover in the forced high speed mode when the selecting step selects the continuous operating mode, and with the step of providing a predetermined constant value indicating which operating cycles of the prime mover are to be operated at the forced high speed mode when the selecting step selects the cycling start-stop operating mode.

14. The method of claim 1 including the step of operating the refrigeration unit in a cycling start-stop mode which includes the steps of:
stopping the prime mover when predetermined null conditions are met, to enter a null cycle,
and starting the prime mover when the predetermined null conditions are no longer met, with the step of providing the predetermined constant value indicating which operating cycles of the prime mover are to be operated at the forced high speed mode.

15. The method of claim 14 wherein an operating cycle of the prime mover terminates when the conditions for entering a null cycle are met, Without regard to whether the operating cycle is a forced high speed cycle.

16. The method of claim 14 wherein the predetermined parameter of the refrigeration system is a null cycle, and including the step of counting the null cycles, and wherein the step of providing a predetermined constant value results in a number N, the comparison step compares the count of null cycles with N, the predetermined result of the comparison step is equality, and including the step of operating the prime mover in the forced high speed mode after every N null cycles.

17. The method of claim 14 including the steps of:
   initiating a defrost cycle to defrost the evaporator coil,
   interrupting an active forced high speed mode when the step of initiating a defrost cycle occurs during an active forced high speed mode,
   returning the prime mover to the low speed mode when interrupted by a defrost cycle,
   determining if predetermined conditions for a null cycle are met at the termination of the defrost cycle,
   entering a null cycle when the determining step finds that the conditions for a null cycle are met,
   and returning the prime mover to the interrupted forced high speed mode when the determining step finds that the conditions for a null cycle have not been met.

* * * * *